United States Patent [19]
Beeck et al.

[11] Patent Number: 6,162,018
[45] Date of Patent: Dec. 19, 2000

[54] ROTOR FOR THERMAL TURBOMACHINES

[75] Inventors: Alexander Beeck, Kussaberg, Germany; Cornelis Striezenou, Nussbaumen, Switzerland

[73] Assignee: Asea Brown Boveri AG, Baden, Switzerland

[21] Appl. No.: 09/220,603

[22] Filed: Dec. 28, 1998

[30] Foreign Application Priority Data

Dec. 27, 1997 [DE] Germany .......................... 197 57 945

[51] Int. Cl.$^7$ .................................................. B63H 1/14
[52] U.S. Cl. ........................................ 416/96 R; 415/180
[58] Field of Search ............................. 416/96 R, 96 A, 416/97 A; 415/47, 48, 115, 116, 117, 176, 180

[56] References Cited

U.S. PATENT DOCUMENTS 5,639,209   6/1997   Pollini et al. ........................ 415/116

FOREIGN PATENT DOCUMENTS

0761929A1   3/1997   European Pat. Off. .
528898      7/1931   Germany .
949611      3/1956   Germany .
2633829C2   1/1978   Germany .

*Primary Examiner*—Edward K. Look
*Assistant Examiner*—James M. McAleenan
*Attorney, Agent, or Firm*—Burns, Doane, Swecker & Mathis, L.L.P.

[57] ABSTRACT

The invention relates to a rotor for thermal turbomachines in a steam power process with a centrally arranged hollow space, several axis-symmetrical hollow spaces, at least two pipes with different diameters and lengths, and at least two through-openings in the mantle, whereby at least one opening is arranged in the turbine part and at least one opening in the compressor part or the middle part, and the openings of the various pipes overlap in the warm operating state in the turbine part, while they overlap in the compressor part and middle part in the cold operating state. At the waste gas side end of the rotor, the hollow space is in the cylindrical part limited by the inside wall of the through-pipe and is provided for supplying steam. The pipe is surrounded in the cylindrical part by another hollow space that is arranged concentrically around the pipe and is provided for removing steam.

7 Claims, 4 Drawing Sheets

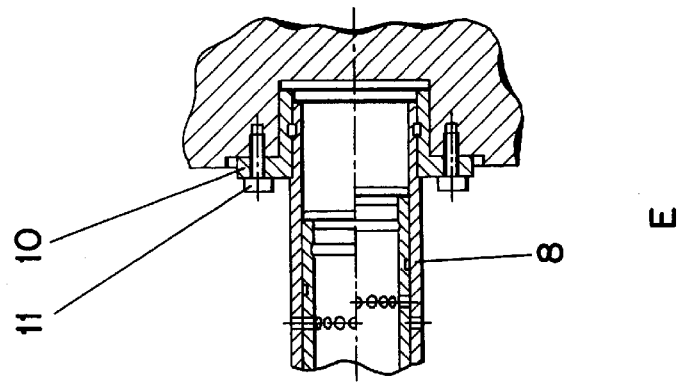
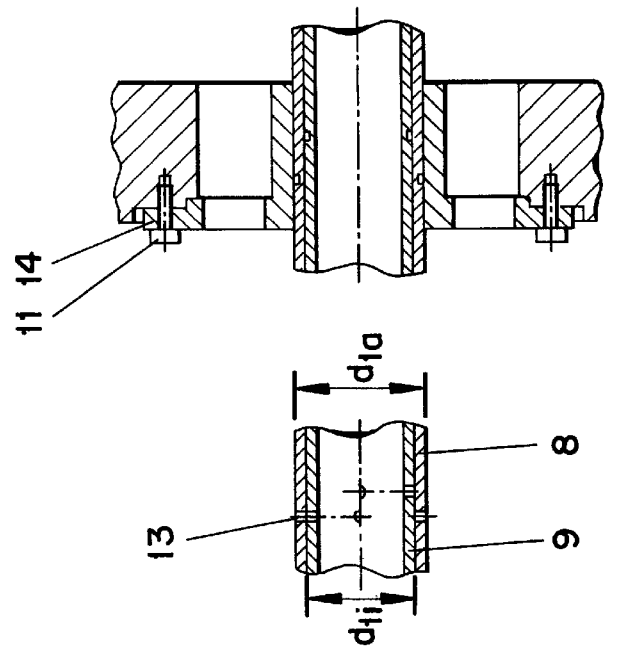
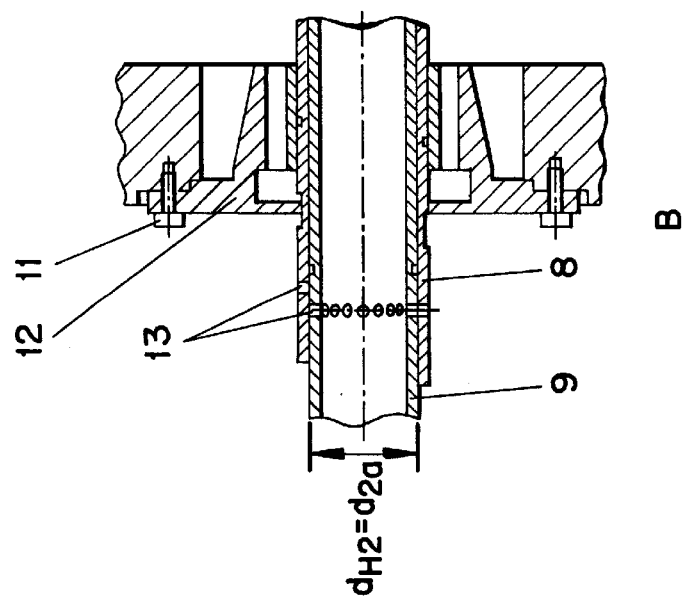

ROTOR FOR THERMAL TURBOMACHINES

FIELD OF THE INVENTION

The invention relates to a rotor for thermal turbomachines in a steam power process.

BACKGROUND OF THE INVENTION

It is known that rotors for steam and gas turbines, for compressors, and for turbogenerators are constructed of individual rotational bodies with hollow spaces. DE 26 33 829 C2 describes, e.g., rotors constructed of forged parts in the shape of disks or hollow cylinders, whereby the individual disks or drums (hollow cylinders) preferably have a constant thickness in the rotor center. The disks or drums are hereby connected with each other via low-volume welding seams.

In order to keep, e.g., the operating temperatures of gas turbine rotors during full load operation approximately constant, they must be cooled. For this purpose, cooling air is usually supplied into the rotor through the waste gas side shaft end. The rotor therefore has a center bore which extends from the waste gas side shaft end to the last turbine disk. This bore forms the rotor cooling air channel. The cooling air is removed from a specific compressor stage and is supplied via a special conduit into the central bore at the waste gas side end of the rotor, whereby the conduit/rotor transition is sealed with labyrinth seals. The cooling air flows through the rotor cooling air duct and then into the hollow space between the two turbine disks before it passes the turbine blades or reaches the rotor surface through radial hollow spaces and mixes with the waste gas stream.

This known arrangement does permit a cooling of the rotor once full operation is reached, so that small blade clearances and high degrees of efficiency can be achieved. But a positive influencing of the rotor under transient operating conditions, which are particularly critical due to the different thermal behavior of rotor and stator, is not possible.

EP 0 761 929 A1 describes a rotor for thermal turbomachines which substantially eliminates these disadvantages. In this rotor, in particular in a compressor part, center part, and turbine part arranged on a shaft, whereby the rotor consists primarily of individual rotational bodies that are welded to each other. This geometric shape results in the creation of axially symmetrical hollow spaces between the respectively adjoining rotational bodies. Another cylindrical hollow space is provided that extends around the center axis of the rotor and reaches from the down-stream end of the rotor to the last hollow space up-stream. At least two pipes of varying diameters and lengths which overlap at least partially and are placed in the cylinder-shaped hollow space, whereby each of the pipes is firmly anchored at least at one fixed point, and the fixed points of the pipes are located at different places. The pipes are each provided with at least two through-openings in the mantle, whereby at least one opening in the turbine part and at least one opening in the compressor or center part, and the openings of the various pipes in the warm operating state overlap in the turbine part, while in the cold state they overlap in the compressor and middle part. This rotor can be thermally regulated by an air supply.

The disadvantage of this solution known from EP 0 761 929 A1 is that a relatively large amount of air is required for the thermal regulation of the rotor since the heat transmission coefficient is low. There is an additional expenditure to provide this air.

BRIEF SUMMARY OF THE INVENTION

The invention attempts to avoid this disadvantage. It is based on the task of designing a rotor of a turbomachine in such a way that it reaches its operating state within a very short time and can be regulated faster thermally, i.e. it can be heated or cooled as required with relatively little expenditure.

According to the invention, this is achieved by a rotor having a plurality of rotational bodies welded to each other. The rotational bodies have hollow spaces for receiving a pipe in the hollow spaces. The hollow space in the cylindrical part at the waste gas side end of the rotor is limited by the inside wall of the pipe that passes through the rotor and is provided for supplying steam, and that the pipe in the cylindrical part at the waste gas side end of the rotor is surrounded by another hollow space that is arranged concentrically around the pipe and is provided to remove steam.

The advantages of the invention are that the rotor can be optionally heated or cooled depending on the various operating conditions, that it responds very quickly, and that the steam in the machine can be further used, e.g., for cooling the turbine blade feet, the blades, or the heat build-up segments.

Advantageous designs of the invention are characterized in that the further hollow space in the cylindrical part at the waste gas side end of the rotor is limited directly by the pipe and the rotor. The hollow space is limited by said pipe and another pipe that is arranged concentrically to it and connected directly with the rotor. The two pipes are connected with each other via struts distributed along the circumference.

It is particularly useful if the rotor and the pipes consist of different materials with the greatest possible differential in heat expansion coefficients. This permits an especially good regulation.

It is also advantageous if the holes are arranged so as to be distributed along the circumference of the pipes, and that the holes of the pipe with the smaller circumference are provided with grooves along their outside diameter. This eliminates the need for a precise adjustment of the pipes during installation into the rotor.

It is also useful if the diameter $d_{H1}$ of the cylinder-shaped hollow space in the area between the first and the last hollow space is greater than the outside diameter $d_{2a}$ of the pipe with the largest circumference. By this arrangement, the pipe is provided with a mean for sealing the middle part of the turbine part, e.g., with a specially constructed centering piece which only functions as a seal in the warm operating state. In addition to the above-mentioned advantages, this also ensures the steam flow.

BRIEF DESCRIPTION OF THE DRAWING

Several preferred embodiments of the invention are shown in the accompanying drawings, in which:

FIG. 3 is an enlarged partial longitudinal section in area B of FIG. 1;

FIG. 4 is an enlarged partial longitudinal section in area C of FIG. 1;

FIG. 5 is an enlarged partial longitudinal section in area D of FIG. 1;

FIG. 6 is an enlarged partial longitudinal section in area E of FIG. 1;

Only those elements necessary for understanding the invention are portrayed. For example, the rotating blades and rotor bearings as well as the blade carrier, combustion chamber, waste gas housing of the gas turbine and steam cycle are not shown. The steam flow direction is designated with arrows.

DETAILED DESCRIPTION OF THE INVENTION

The invention is explained in more detail below in reference to exemplary embodiments and FIGS. 1 to 8.

Figure 1:
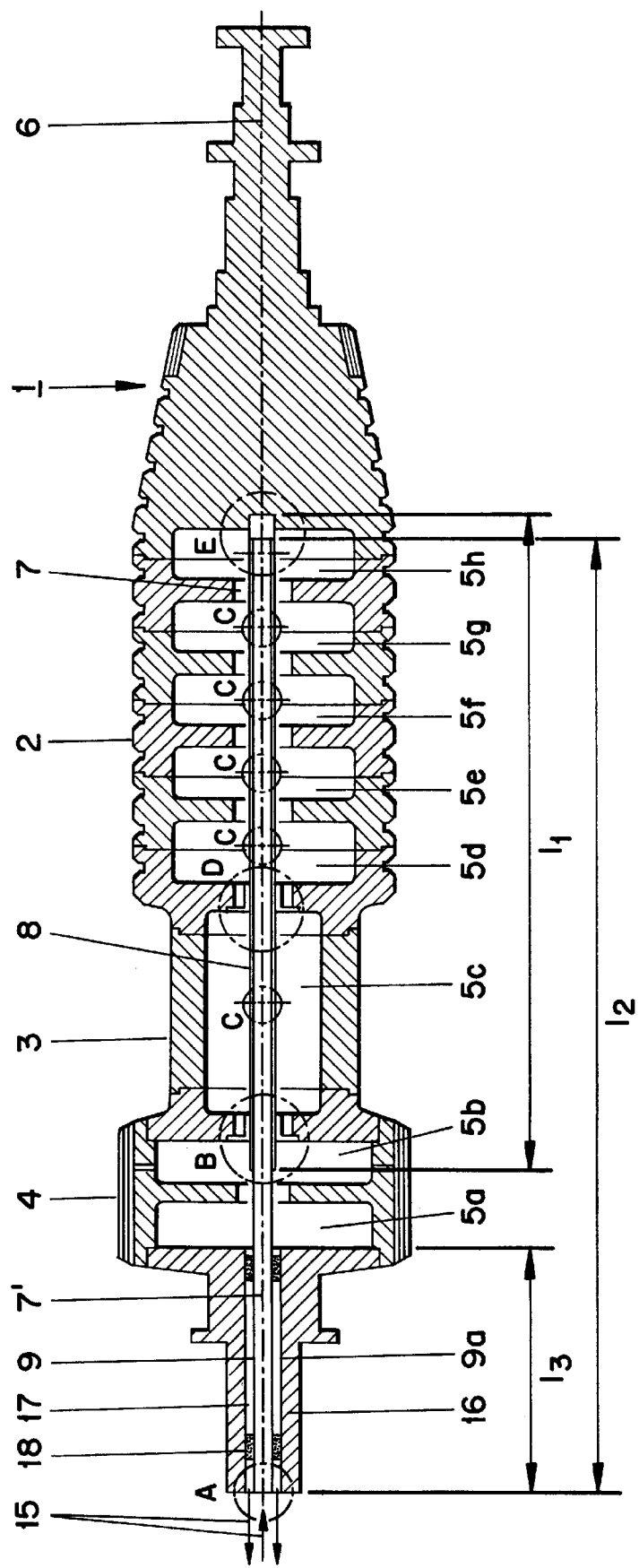
FIG. 1 is a longitudinal sectional view of the rotor.
Figure 2A:
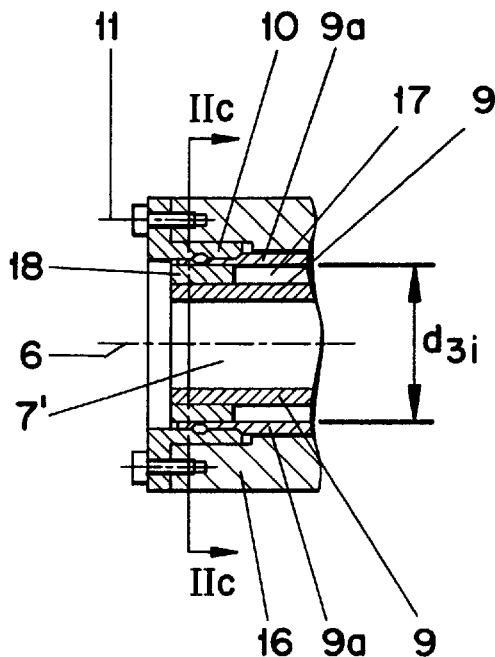
FIG. 2a is an enlarged, partial longitudinal sectional view in the area A of FIG. 1.
Figure 2C:
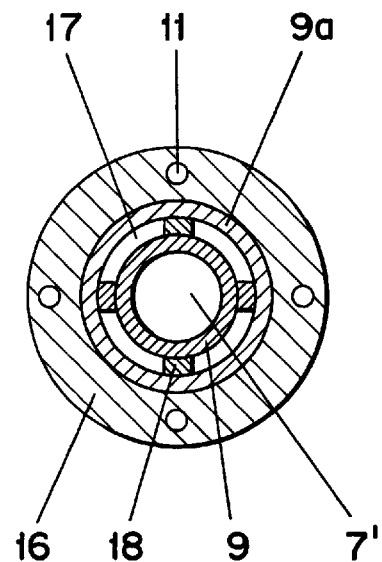
FIG. 2c is a cross-section of FIG. 2a along line IIc—IIc.
Figure 2B:
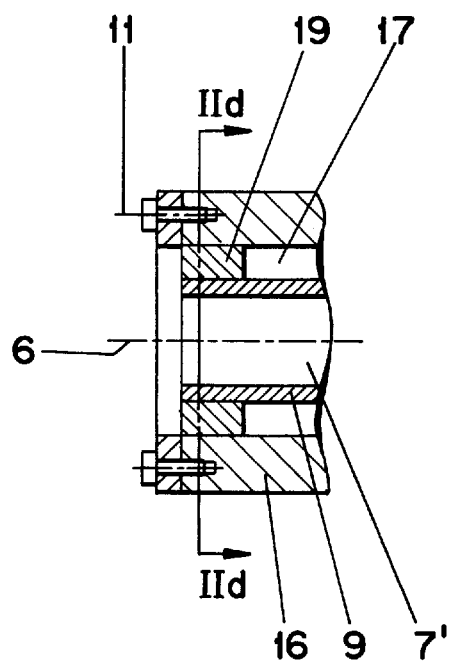
FIG. 2b is an enlarged partial section in the area A of FIG. 1 of a second modified form of the invention.
Figure 2D:
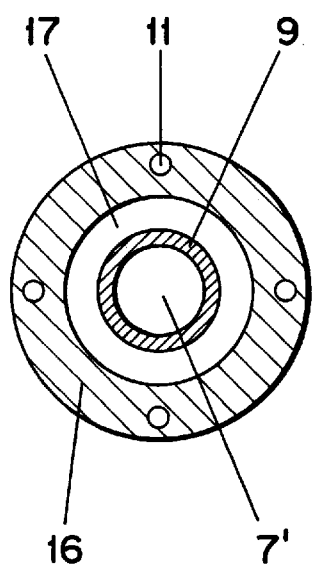
FIG. 2d is a cross-section of FIG. 2b along line IId—IId.

FIG. 1 shows a longitudinal section through a rotor 1 according to the invention of a single shaft, axial flow gas turbine. The rotor 1 consists of a compressor part 2, a middle part 3, and a turbine part 4. It is constructed by way of a low-volume welding seam according to DE 26 33 829 C2 of individual disks in the shape of rotational bodies. These disks limit several-in this exemplary embodiment: eight-rotation-symmetrical hollow spaces $5a$ to $5h$ inside the rotor 1, whereby the hollow spaces $5a$ and $5b$ are located in the turbine part 4, the hollow part $5c$ in the middle part 3, and the hollow spaces $51$–$5h$ in the compressor part 2. The cylinder-shaped hollow space 7, 7' extends from the waste gas side end (left side in FIG. 1) over almost the entire length around the rotor axis 6. The hollow space has a larger diameter $d_{H1}$ in the area between the first hollow space $5a$ and last hollow space $5h$. This is the area between the first compressor disk and the second-here last-turbine disk than the diameter of the cylinder part 16, which extends than from the last turbine disk to the waste gas side end of the rotor 1 on the waste gas side ($d_{H2}$).

The cylinder-shaped hollow space 7 holds two pipes 8, 9 with different diameters and lengths. The shorter pipe 8 with a length $1_1$ and an inside diameter $d_{1i}$ is fixed at the compressor-side end of the hollow space 7 to the compressor part 2 of the rotor 1. The pipe 8 extends into the turbine part 4. The longer pipe 9 with a length $1_2$ and an outside diameter $d_{2da}$ is fixed at the other end of the hollow space 7', which is at the waste gas end of the turbine 4. The following applies approximately: $d_{H2}=d_{2a}=d_{1i}$. To this extent, the rotor is known from document EP 0 761 929 A1.

According to the invention, the hollow space 7' in the cylinder part 16 is now limited at the end of the rotor 1 on the waste gas side by the pipe 9 that passes through the rotor 1. The pipe 9 is provided for supplying steam. The pipe 9 in the cylindrical part 16 is additionally surrounded at the waste gas side end of the rotor 1 by another hollow space 17 that is arranged concentrically around the pipe 9 and is provided for removing steam 15.

FIGS. 2 to 6 show enlarged partial longitudinal sections of pipes 8, 9 which have the function of regulating rods in the various areas of the rotor 1. The upper part of the drawing (FIGS. 3 to 6) in each case represents the cold state, the bottom part represents the warm state.

FIG. $2a$ and FIG. $2c$ shows the waste gas side end 16 of the rotor 1 in the area A of FIG. 1 in a first exemplary example of the invention. In this area (cylinder-shaped part 16) an additional pipe $9a$ with a length $1_3$ and an inside diameter $d_{3i}$ which is greater than the outside diameter $d_{2a}$ of pipe 9 is arranged next to the center pipe 9 in a concentric manner around this pipe 9 so that a further hollow space 17 is formed. Struts 18 connect the two pipes 9 and 91 firmly with each other. The pipes 9 and $9a$ are connected with the help of a screwed-on flange 10 via screws 11 firmly with the rotor 1. In this way the area A of FIG. 1 accommodates the pipes 9 and $9a$ inside the rotor 1. Steam 15 is supplied via hollow space 7' into the rotor; steam 15 leaves the rotor via hollow space 17.

FIGS. $2b$ and $2d$ show the waste gas side end 16 of the rotor 1 in the area A of FIG. 1 in a second exemplary embodiment of the invention. In the cylindrical part 16 of rotor 1, the pipe 9 is arranged in the center of the rotor 1, as is the case in the exemplary embodiment according to FIG. $2a$. This pipe limits the hollow space 7' that exists inside the pipe 9. Because of an oversized bore, another hollow space 17 exists between the pipe 9 and rotor 1. The pipe 9 is connected via welded-on parts 19, e.g., wings, with the rotor 1, so that a fluttering is avoided during the operation. In this case also, steam 15 is introduced into the rotor 1 via hollow space 7', and steam 15 is removed via hollow space 17 from the rotor 1. Because of this, only one pipe 9 is provided inside the rotor 1 in the area A (see FIG. 1) according to this example.

Areas B to E in FIG. 1 described below are identical in the variations according to FIGS. $2a$ and $2c$, and $2b$ and $2d$, respectively.

In the area B (transition from middle part 3 to turbine part 4, see FIG. 3), the two pipes 8 and 9 overlap. In addition, a means 12 for sealing the middle part 3 against the turbine part 4 is provided here on the outside pipe also. The means 12 is a centering piece which is screwed to the rotor 1 by screws 11. The centering piece simultaneously acts as a regulating piece in that it permits steam to pass through in the cold state, and seals the middle part 3 and the turbine part 4 against each other in the warm state.

The pipes 8, 9 are provided with openings 13 distributed along the circumference, whereby in the area B, in the cold state, the openings 13 are located at different places of the axial length, while they exactly overlap each other in the warm state and thus form a through-opening 13.

FIG. 4 shows each the two pipes 8, 9 in the middle of hollow spaces $5c$ to $5g$, i.e., in the area C. Here the bores 13 are provided in the pipes 8, 9 in such a way that they are exactly opposite each other in the cold state of the system and in this way form a through-opening 13. In the warm state, however, the openings 13 are offset from each other.

FIG. 5 shows area D. This is the transition from the compressor part 2 to the middle part 3. No bores 13 are provided in the pipes 8, 9 in this area. Another centering piece 14 which is fixed with screws 11 to the compressor part 2 was pushed here over pipes 8, 9. The centering piece 14 acts as a support for pipes 8, 9.

FIG. 6 shows area E, i.e., the area in which the pipe 8 with the larger diameter is fixed to the compressor part 2. The pipe 8 is screwed together with a flange 10 with a stop and is fixed with screws 11 to the compressor rotor 2. The fixation of the pipes (8, 9, $9a$) naturally may also be accomplished differently in other exemplary embodiments, e.g., by welding, shrinking, or clamping.

Function of the Thermal Regulation

When the gas turbine is started, i.e., when it is in the cold state, the rotor 1 must be heated so that it will reach its operating state as quickly as possible. For this reason, a specific amount of steam 15 is removed from the steam cycle or is generated during the system start-up, and is introduced into the hollow space 7' at the down-stream end (16) of the rotor 1. Since both pipes 8, 9 or the rotor 1 are still cold, the openings 13 of pipes 8 and 9 are offset to each other in the area of the turbine (area B, FIG. 3, top part), while they overlap in areas C and E, i.e., in the compressor part 2 and in the middle part 3 and thus form a through-opening 13. This means that the steam 15 flows along from the down-stream end of the rotor 1 via the turbine part 4 in the pipe 9 and is fed by the (refer to FIG. 6) openings 13 in areas C and E (see FIGS. 1, 4 and 6) into the compressor chamber. From there, the steam passes through the entire rotor and is then used, e.g., for cooling the turbine blade feet. It leaves the rotor 1 through the hollow space 17 and returns to the closed cycle with the steam turbine.

The rotor 1 is now heated evenly and expands, as do the pipes 8, 9 which act as regulating rods. Since the thermal expansion coefficients of rotor 1 and regulating rods 8, 9 are very different from each other to provide an effective regulation. Weldable steel is selected as the material for the rotor 1, and, e.g. aluminum or plastic for the pipes 8, 9.

If the rotor 1 is now supposed to be cooled in the warm state, the steam 15 is fed only into the turbine part 4, so that it only must cool the turbine area. This regulation takes place thermally, since-due to the thermal expansion of the two pies 8, 9 which because of the respective fixation on different points acts into the opposite direction-the openings 13 in the two pipes 8, 9 in areas C and E are now offset relative to each other, while the opening 13 are aligned with each other in the area B so that the steam 15 easily passes through these through-openings into the turbine part 4 (see FIG. 3, lower part).

A simple, thermal regulation of the rotor takes place, whereby the steam in the turbine range can be used to cool, e.g., the blade feet. It is then returned in the closed cycle to the steam turbine. The steam can also be fed specifically to the gas turbine process, e.g., in order to enhance performance.

Pipes 8, 9 may be rotated relative to each other, since the pipes are provided with grooves near the through-holes. In addition, various places not shown in the figures are also provided with heat-resistant seals which stabilize pipes 8, 9.

Since during the start-up of the combination system frequently no steam will be available, a switch-over device must be provided in order to ensure the function in an emergency through another medium, e.g., air. This switch-over device is logically arranged outside the gas turbine.

In comparison to air, only small amounts of steam are required since the heat transmission coefficients are much higher than for air.

Figure 7:
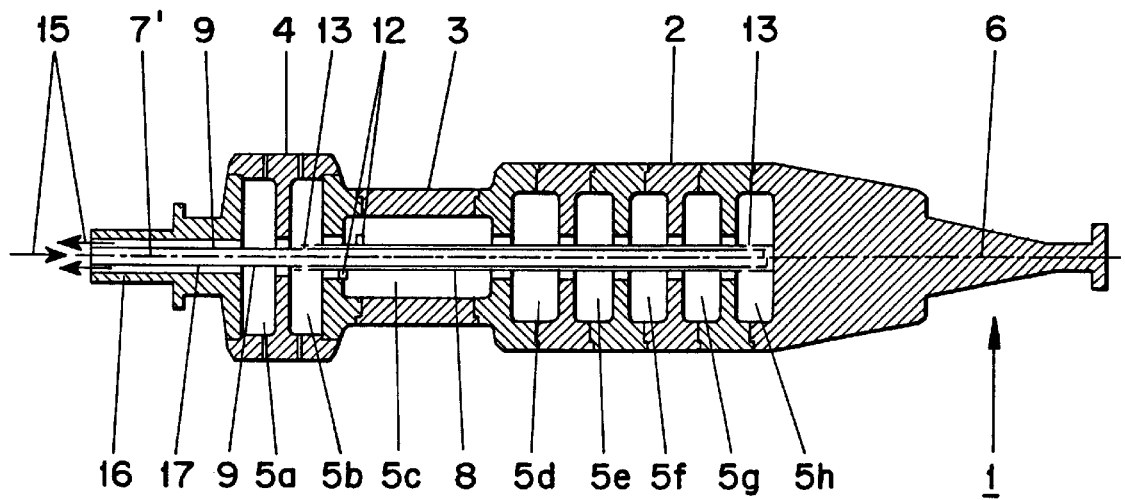
FIG. 7 is a longitudinal section of the rotor of a second modified form of the invention.

FIG. 7 shows another exemplary embodiment, whereby the top part of the drawing again shows the cold state of the rotor, and the bottom part shows the warm state. The only difference to the first embodiment is that the outside pipe 8 is provided only with one opening 13 in the turbine part 4 and in the compressor part 2, and the inside pipe 9 has only one opening 13 in the turbine part 4, whereby in the cold state only the opening 13 in the compressor part 2 is open to the steam 15 which then flows through hollow spaces 5 into the middle part 3 and into the turbine part 4 and finally to the turbine blades which are now shown. In the warm state (see bottom part of the drawing), the heat expansion causes the opening 13 in the compressor part 2 to close, while the openings 13 in the turbine part 4 overlap and thus form a port through which the steam 15 can flow. The closing element 12 attached to the pipe 8 prevents a steam flow into the middle or compressor parts (2, 3) in the warm state.

Figure 8:
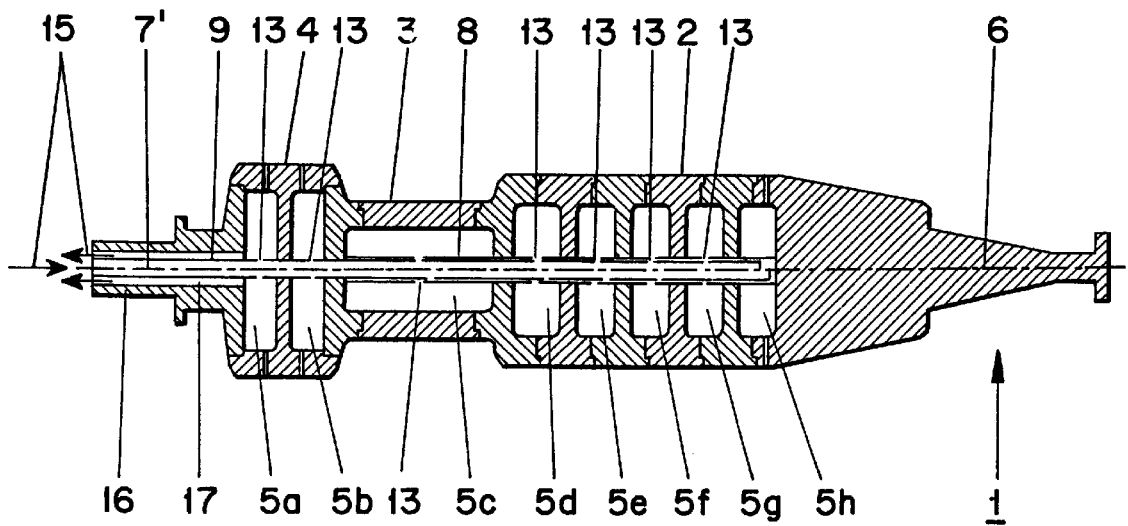
FIG. 8 is a longitudinal section of the rotor of a third modified form of the invention.

Because of the adaptation of the diameter of the cylinder-shaped central hollow space 7 to the diameters of pipes 8, 9, the embodiment shown in FIG. 8 has, in comparison to the above-described examples, the disadvantage that the steam 15 in the middle part 3 and the compressor part 2 of the rotor 1 is not fed any further (except in area 5h). It can in fact be removed, e.g., through additional openings in the middle part 3 and in the compressor part 2 from the rotor 1, but this leads to high losses.

The invention is naturally not limited to the exemplary embodiments shown here. It can also be used for other turbomachines, e.g., steam turbines and turboloaders.

We claim:

1. A rotor for thermal turbomachines comprising:

a compressor part, a middle part, and a turbine part that are secured to each other to form a rotor having an axis of rotation, each of the parts having axially symmetrical hollow spaces between the adjoining parts and a cylindrical part at the waste gas side end of the rotor, the hollow spaces also extend around the axis of the rotor from the down-stream end of the rotor to the last hollow space upstream, a first pipe and a second pipe, the first pipe having a smaller diameter than the second pipe, the pipes being mounted to overlap at least partially over a certain length, the pipes are placed in the hollow space whereby the pipes each are anchored firmly on at least one fixed point, the fixed points of the pipes are located at different points spaced longitudinally of the rotor axis, each of the pipes has at least two openings, at least one opening is arranged in the turbine part, and at least one opening is arranged in the compressor part or middle part, and the openings of the various pipes in the warm operating state overlap in the turbine part, while in the cold state they overlap in the compressor part and the middle part the hollow space in the cylindrical part on the waste gas side end of the rotor is limited by the inside wall of the pipe that passes through the rotor and is provided for supplying steam, and the pipe in the cylindrical part at the waste gas side end of the rotor is surrounded by a hollow space that is arranged concentrically around the pipe and is provided to remove steam.

2. The rotor as claimed in claim 1, wherein the hollow space is limited by the pipe and the rotor.

3. The rotor as claimed in claim 1, wherein the hollow space has a third pipe secured in the rotor and spaced radially of the first pipe, first and third pipes are connected with each other by struts distributed along the circumference.

4. The rotor as claimed in claim 1, wherein the rotor and the pipes are made of different materials with the greatest possible differential in heat expansion coefficients.

5. The rotor as claimed in claim 1, wherein the holes each are arranged so as to be distributed along the circumference of the pipes.

6. The rotor as claimed in claim 5, wherein the holes of the first mentioned pipe are provided with grooves along their outside diameter.

7. The rotor as claimed in claim 1, wherein the diameter ($d_{hi}$) of the cylinder-shaped hollow space in the area between the first and the last hollow space is greater than the outside diameter ($d_{2a}$) of the second pipe, and a seal is provided for sealing between the rotor and the second pipe at the middle part or the turbine part, the seal being arranged to function as a seal in the warm operating state.

* * * * *